United States Patent
Cau et al.

[19]

[11] Patent Number: 6,089,513
[45] Date of Patent: Jul. 18, 2000

[54] ASSEMBLY FOR PROTECTING AND FASTENING PIPES TO A SUPPORTING STRUCTURE, PARTICULARLY OF A VEHICLE

[75] Inventors: Pietro Cau; Rocco Calabrese, both of Turin, Italy

[73] Assignee: I.T.W. Fastex Italia S.p.A., Strasa Settimo, Italy

[21] Appl. No.: 09/035,927

[22] Filed: Mar. 6, 1998

[30] Foreign Application Priority Data

Mar. 7, 1997 [IT] Italy .................................. TO97A0191

[51] Int. Cl.$^7$ ...................................................... F16L 3/22
[52] U.S. Cl. ............................................................ 248/68.1
[58] Field of Search ............................... 248/68.1, 72, 73, 248/74.2

[56] References Cited

U.S. PATENT DOCUMENTS

| | | | |
|---|---|---|---|
| 1,649,355 | 11/1927 | Lindsay | 248/68.1 |
| 2,497,820 | 2/1950 | Kielland | 248/68.1 |
| 2,605,387 | 7/1952 | Brodie | 248/68.1 |
| 3,531,071 | 9/1970 | Kubli | 248/68.1 |
| 3,894,706 | 7/1975 | Mizusawa | 248/68.1 |
| 4,840,333 | 6/1989 | Nakayama | 248/68.1 |
| 4,899,964 | 2/1990 | Sick | 248/68.1 |
| 4,905,942 | 3/1990 | Moretti | 248/68.1 |
| 5,033,701 | 7/1991 | Kraus | 248/68.1 |
| 5,271,587 | 12/1993 | Schaty | 248/68.1 |
| 5,271,588 | 12/1993 | Doyle | 248/68.1 |

FOREIGN PATENT DOCUMENTS 2 200 426  8/1988  United Kingdom .................. 248/68.1

*Primary Examiner*—Anita M. King
*Assistant Examiner*—Michael Nornberg
*Attorney, Agent, or Firm*—Lowe Hauptman Gopstein Gilman & Berner

[57] ABSTRACT

An assembly for protecting and fastening pipes to a vehicle body/underbody fitted with projecting electrowelded threaded fastening pins; the assembly includes at least one supporting element, and a protection element in the form of a channel snap-on connectable integral with one or more supporting elements, which are defined by respective clips, each having at least one through seat for housing a pipe, and a through hole perpendicular with respect to the seat and for engaging a respective threaded pin; the clips have integral elastic snap-on connecting means for retaining the channel, which is of predetermined length, is U-shaped in section, and has conjugate retaining elements, in which case, the through hole is provided internally with gripping means for gripping the pins; or the hole is a through hole, and the assembly also includes a sleeve, which engages the hole in the clip as well as a corresponding slotted through hole in the channel by means of a tubular body provided internally with means for gripping the pins, and having a head which rests against the channel.

14 Claims, 1 Drawing Sheet

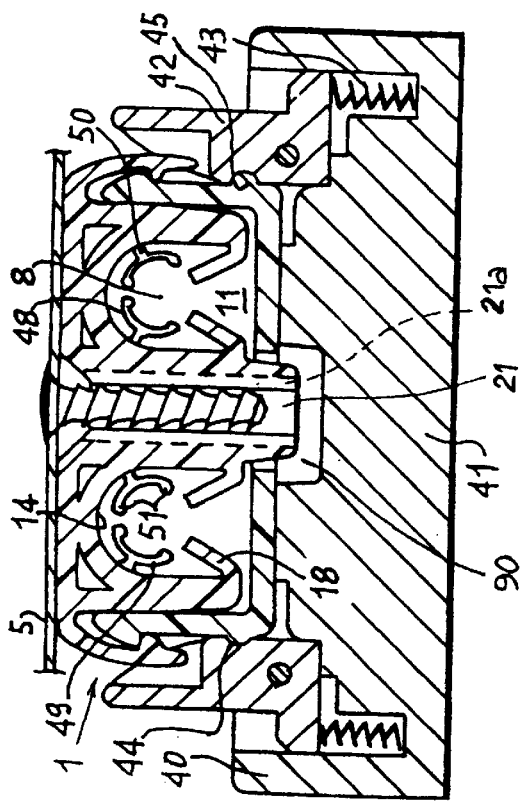
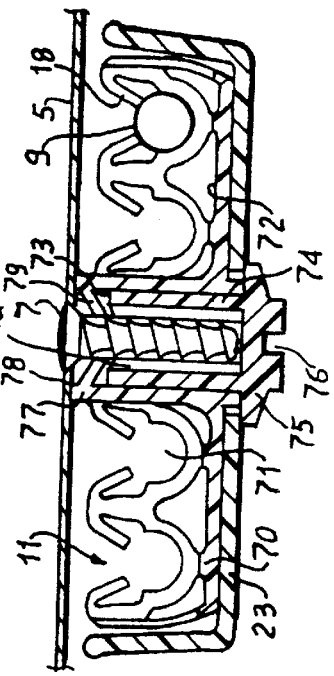
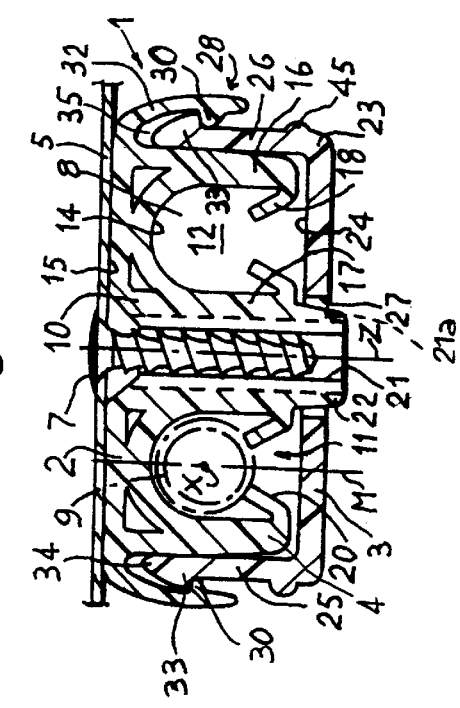
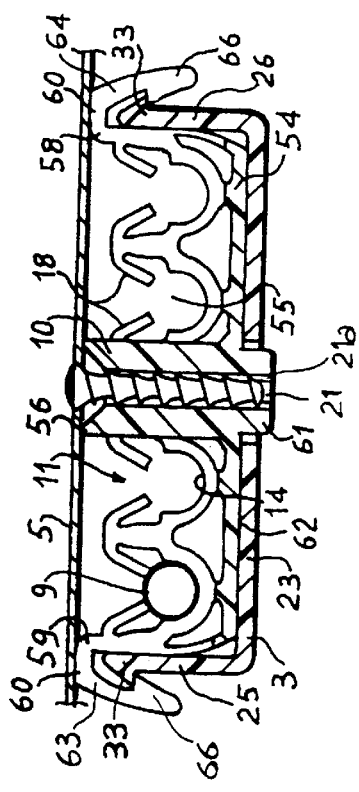

ASSEMBLY FOR PROTECTING AND FASTENING PIPES TO A SUPPORTING STRUCTURE, PARTICULARLY OF A VEHICLE

BACKGROUND OF THE INVENTION

The present invention relates to an assembly for protecting and fastening pipes to a supporting structure, particularly of a vehicle, and more specifically to an assembly for protecting and fastening pipes, such as fuel and/or brake oil feed pipes, to a vehicle underbody.

On currently marketed vehicles, the brake oil feed pipe is made mostly of metal, and the fuel feed pipe of plastic, except for the portion thereof located in the engine compartment which, to protect the pipe against engine heat, or accidental contact with the vehicle body in the event of violent impact, is made of metal and connected to the plastic portion.

One known element or bracket for fastening pipes, e.g. fuel and/or brake oil pipes, to the vehicle frame or underbody comprises a rigid-plastic body having a surface which rests on the frame, and half-open substantially cylindrical pipe seats defined partly by the body itself and partly by a curved elastic wall which flexes to permit insertion of the pipe. A sleeve with a head is inserted inside a hole through the element between two seats, and clicks onto an electrowelded fastening pin (TUCKER®) projecting downwards from the frame or underbody, and from which the sleeve can only be unscrewed.

Pipes fitted as described above are obviously subject to damage in the event of an accident, or, if made of plastic, by the heat generated by the engine in the engine compartment, or by the exhaust pipe. To protect the pipes, independent protection elements are therefore used, which are assembled separately from the brackets and fitted directly to the vehicle body or inside seats on further elements formed integral with the brackets. Besides being expensive, such protection elements therefore involve a long painstaking assembly process.

SUMMARY OF THE INVENTION

It is an object of the present invention to provide an assembly for protecting and fastening pipes to a supporting structure, particularly of a vehicle, designed to overcome the aforementioned drawbacks, and which, in particular, provides for effectively protecting the pipes, is quick and easy to assemble, may even be assembled automatically, and is both compact and cheap to produce.

According to the present invention, there is provided a fastening and protection assembly for protecting and fastening pipes to a supporting structure, comprising at least one pipe supporting element defined by a clip made of molded synthetic plastic material and in turn comprising a central portion with a through hole cooperating with respective fastening means for fitment to the supporting structure, and at least one seat closed partly by elastic flexible walls enabling a pipe to be inserted inside the seat through a mouth defined by the walls. A protection element for protecting the pipes, in accordance with the invention, is in the form of a channel and provides a structure for receiving, internally, at least a portion of each clip; and snap-on connecting means for connecting the channel and the clip.

The protection channel may therefore be assembled simultaneously with the pipe clips, or may be assembled off-line beforehand, and appropriate fixtures used to fit the off-line-assembled pipe/fastener/protection assembly fully automatically to the vehicle body.

BRIEF DESCRIPTION OF THE DRAWINGS

A preferred, non-limiting embodiment of the present invention will be described by way of example with reference to the accompanying drawings, in which:

FIG. 1 is a cross section view of a fastening and protection assembly in accordance with the present invention;

FIG. 2 is a cross section of the FIG. 1 assembly on a conveying and assembly fixture;

FIG. 3 is a cross section of a variation of the FIG. 1 assembly,

FIG. 4 is a cross section of a further variation of the assembly according to the invention.

DETAILED DESCRIPTION OF THE INVENTION

Reference numeral 1 in FIG. 1 indicates as a whole an assembly for fastening and protecting pipes in accordance with the present invention, and which comprises at least one supporting element 2, and a protection element 3 which snaps onto one or more supporting elements 2.

Each supporting element 2 forming part of assembly 1 is defined by a single body or bracket 4—hereinafter referred to simply as a clip 4—molded from synthetic plastic material and, according to a preferred embodiment of the invention, made of polyamide or acetal resin, possibly with an elastomeric filler. In use, clip/s 4 is/are fitted to a supporting structure—in the example shown, a vehicle body or underbody 5—by fastening means, e.g. threaded pins 7 (known as TUCKERS®), electrowelded to and projecting downwards from vehicle body or underbody 5.

Each clip 4 comprises at least one seat 8 for a pipe 9; and a central portion 10 having a through hole 21 with an axis Z substantially perpendicular to the axis X of seat 8.

In the non-limiting embodiment shown, clip 4 comprises two seats 8, each for housing a respective pipe 9. Seats 8 are located symmetrically on opposite sides of central portion 10, and each seat 8 is substantially cylindrical, and comprises a mouth 11 through which pipe 9 is inserted inside the seat. A cavity 12 is defined opposite the mouth 11 by a substantially semicylindrical surface 14 against which pipe 9 rests, and which, after assembly, extends along an axis X (axis X in FIG. 1) coincident with the axis of pipe 9.

Opposite mouths 11, clip 4 is defined externally by a flat base 15 facing vehicle body 5 in use.

Each cavity 12 is defined laterally by two facing parallel walls 16 and 17; wall 16 is elastic and flexible to permit insertion of pipe 9 inside seat 8, and is located outwards of clip 4; and wall 17, located towards the center of clip 4, defines central portion 10.

At mouth 11, walls 16 and 17 comprise opposed elastic projections 18 sloping inwards of cavity 12 and symmetrical with respect to a mid plane M through axis X. The free end of each projection 18 has an arc-shaped section of substantially the same radius as pipe 9 to define a small contact region between the projection and the outer surface of pipe 9. Projections 18 are of such a length as to press radially with a small amount of interference against the inserted pipe 9, so that the pipe is maintained elastically stable, resting against semicylindrical surface 14, while at the same time substantially damping any vibration induced in the pipe by vehicle body 5.

The outer surfaces 20 of projections 18 define mouth 11, and the projections provide for assisting insertion of pipe 9, while at the same time preventing accidental withdrawal of the pipe from the respective seat.

Central portion 10 with through hole 21—which is substantially perpendicular to flat base 15—extends axially, on the opposite side to flat base 15, with a collar 22 projecting axially with respect to mouths 11 and so defining a locator for locating protection element 3.

Protection element 3 comprises a predetermined length of a thin-walled U-section channel 23 molded or drawn (extruded) from plastic material, preferably copolymer polypropylene with a talc filler (for good heat resistance), and which comprises a protective wall 24 joined along its whole length to two lateral walls 25 and 26 perpendicular to wall 24. Protective wall 24 comprises a number of slotted holes 27 equally spaced along the longitudinal axis (parallel to axis X) of channel 23, and each for housing, in use, collar 22 of a clip 4. The longitudinally-elongated-slot shape of holes 27 provides for compensating for any minor errors in the positioning of clips 4 and channel 23.

In the non-limiting embodiment shown, the through hole 21 of each clip 4 is so sized as to be fitted through with a corresponding pin 7, and comprises, internally, known gripping means 21a (shown schematically by dash lines for the sake of simplicity) for gripping pin 7, and which snap on to pin 7 when pin 7 is force-fitted inside hole 21 (or vice versa), to prevent pin 7 from being withdrawn axially from hole 21 unless the whole of clip 4 is rotated in the unscrewing direction.

Channel 23 and clip 4 comprise respective mating snap-on connecting and retaining means 28 by which protection element 3 is snap-on connected directly to a number of elements 2 for supporting pipe/s 9. Connecting means 28 are defined by a first pair of stop teeth 30 carried by respective elastic flexible arms 32 projecting laterally from clip 4 at the ends of base 15, and by a corresponding mating pair of retaining teeth 33 formed longitudinally on channel 23, on the outside of respective edges 34 of lateral walls 25 and 26, and which engage with mating stop teeth 30 of clip 4. Arms 32 are bent away from base 15, and extend substantially parallel to outer walls 16 of clip 4 to define two cavities 35 inside which stop teeth 30 project.

When channel 23 is fitted to clip 4, the top ends of walls 25 and 26 are inserted inside cavities 35 to flex arms 32 outwards and so permit teeth 33 to slide past and engage with mating teeth 30.

Assembly 1 is fitted to vehicle body 5 as follows: First, pipes 9 are inserted into respective seats 8 of the various clips 4 for assembly (one for each pin 7); clips 4, together with pipes 9, are fitted to respective pins 7 projecting from vehicle body 5, by pushing the clips axially so that base 15 rests against the vehicle body; and channel 23 is fitted to clips 4 by pushing the ends of lateral walls 25 and 26 inside cavities 35 so that teeth 33 engage mating teeth 30. When so doing, slotted holes 27 allow a small amount of axial movement of channel 23 with respect to clips 4 to compensate for any tolerances in the center distances of pins 7.

Clips 4 are fitted to vehicle body 5 with mouths 11 facing away from vehicle body 5, so that, when servicing or replacing pipes 9, each pipe 9 may be removed from respective seat 8, after first removing channel 23, by simply parting projections 18 with an appropriate tool, and without removing clips 4 from vehicle body 5.

Channel 23 is removed from each clip 4 by simply parting elastic arms 32 to release teeth 30 and 33, and then withdrawing the channel from clip 4.

FIG. 2 shows a system for fitting a complete assembly 1, preassembled off-line, to vehicle body 5. After first inserting pipes 9 into a given number of clips 4, channel 23 (or a number of contiguous end-to-end channels 23) is placed on a fixture (or so-called pallet) 40; and pipes 9, together with clips 4 fitted to the pipes, are inserted inside channel/s 23 so that clips 4 snap integrally onto the channel/s. The assembly so formed on pallet 40 may be handled easily, and integrally with pallet 40, by automated assembly line fixtures.

More specifically, pallet 40 comprises a base body 41 having two spaced facing L-shaped jaws 42 hinged laterally to base body 41 for elastically gripping the sides of channel 23 by virtue of springs 43. For more accurate grip, each jaw 42 has a groove 44 for engaging a corresponding semicircular rib or projection 45 formed on the outside of lateral wall 25, 26 of channel 23.

Once assembly 1 is fitted to vehicle body 5, pallet 40 is detached from channel 23 by pulling pallet 40 with respect to channel 23 along axis Z to automatically release jaws 42 from ribs 45, the semicircular shape of which causes jaws 42 to rotate in opposition to springs 43. To release pallet 40 from assembly 1 fitted to vehicle body 5 by simply withdrawing the pallet parallel to axis Z, the pressure exerted by springs 43 need simply be less than the axial force required to release pins 7 from gripping means 21a and channel 23 from clips 4.

Assembly 1 in FIG. 2 differs from the FIG. 1 assembly as regards seats 8, each of which, to better protect pipe 9 from the vibration generated by vehicle body 5, has a semicylindrical surface 14 with two stirrup elements 48 for elastically supporting and preventing pipe 9 from directly contacting semicylindrical surface 14. Each stirrup element 48 is defined by a pair of flexible arms 49 joined centrally to a radial appendage 50 integral with semicylindrical surface 14; and the flexible arms of both stirrup elements terminate with respective rounded portions 51 for contacting and supporting pipe 9 at points equally spaced about the circumference of pipe 9.

Flexible arms 49 cooperate with projections 18 close to mouth 11 to effectively reduce the vibration transmitted by the vehicle body to the pipe.

FIG. 3 shows a variation of supporting element In 2, which in this case is defined by a clip 54 fitted to vehicle body 5 with mouths 11 facing the vehicle body, and having, for example, four seats 55 similar to seats 8 in FIG. 1, and each for receiving a respective pipe 9. On the side facing vehicle body 5, central portion 10 terminates with a flat circular region 56 projecting with respect to mouths 11 and defining a central support resting on vehicle body 5. The two outer lateral walls 58 and 59 project laterally from mouths 11 by an amount equal to the size of region 56 to form two flat lateral supports 60 preventing the assembly from rotating about flat region 56.

On the opposite side to mouths 11, central portion 10 extends axially with a collar 61 projecting with respect to a base wall 62 to define a locator for locating channel 23. Two elastic arms 63 and 64 extend from supports 60, are bent roughly 180° towards base wall 62, and are located externally adjacent to walls 58 and 59, so as each to define a retaining member having a tooth 66 cooperating with a corresponding mating tooth 33 formed on the corresponding lateral wall of channel 23.

In this version, channel 23 is fitted to the base wall 62 side of clips 54. As clips 54 are normally fitted to the underbody, possible breakage of projections 18 in no way jeopardizes retention of pipes 9 inside seats 55, by virtue of pipes 9 resting on top of semicylindrical surfaces 14 and so being retained by force of gravity inside the respective seats. In this version too, portion 10 has a through hole 21 for receiving a pin 7, and which comprises, internally, known means 21a for gripping pin 7.

FIG. 4 shows another way of fixing supporting element 2 to vehicle body 5. Supporting element 2 is defined by a clip 70 having a number of seats 71 (e.g. four) identical to seats 55 in FIG. 3 (and therefore not described in detail), arranged symmetrically on either side of a central portion 10, and integral with a flat base wall 72 on the opposite side to mouths 11. Central portion 10 has a smooth through hole 73 for receiving a fastening element 74 defined, in the example shown, by a known sleeve 74 formed, e.g. molded, from polyamide or acetal resin, and having a flared head 75 with a slot 76 for a screwdriver for maneuvering the fastening element as described later on, and known internal gripping means 21a for gripping pin 7 and of the same type as for clips 4, 54.

The central portion extends axially beyond mouths 11 with a collar 77, which terminates with a flat circular supporting region 78 facing vehicle body 5 when the clip is assembled. Clip 70 is assembled with mouths 11 facing vehicle body 5, so that flat region 78 rests, in use, on the vehicle body.

Internally, collar 77 has a number of radial elastic tabs 79 projecting and sloping inwards of hole 73 and symmetrically with respect to the hole axis; hole 73 is of such a diameter as to house pin 7 with considerable radial clearance, while at the same time permitting engagement of pin 7 by tabs 79; and tabs 79 are so formed as to permit smooth insertion of threaded pin 7 inside clip 70, while at the same time temporarily fastening clip 70 to threaded pin 7 to prevent withdrawal of the clip (along axis Z) when fitting assembly 1 to vehicle body 5, or when detaching channel 23 from clip 70.

As before, assembly 1 may be fitted to vehicle body 5 in two ways. A first is to assemble, off-line, a complete assembly 1 comprising pipes 9 housed inside respective seats in clips 70, and channel 23 fitted and retained to clips 70 by means of respective sleeves 74, each inserted inside hole 73 of a respective clip 70 using pallet 40, the base 41 of which has cavities 90 (FIG. 2) for housing heads 75 of sleeves 74, and prevents withdrawal of sleeves 74 from holes 73 during transfer to the vehicle body assembly line. Once the assembly is positioned facing vehicle body 5 fitted with pins 7, pallet 40 is moved to fit sleeves 74 and tabs 79 on to pins 7 and simultaneously click on to vehicle body 5 both clips 40 and channel 23, which are gripped between heads 75 and vehicle body 5.

Alternatively, clips 70 together with pipes 9 are first fitted to vehicle body 5, to which clips 70 are retained by tabs 79; and channel 23 is then fitted to clips 70 and the respective pipes, and fixed in place by a number of sleeves 74 (one for each clip 70) forced axially on to threaded pins 7 through holes 73.

In both cases, to remove channel 23 to inspect pipes 9, each sleeve 74 may be unscrewed from respective pin 7 using a screwdriver in slot 76; and clip 70, together with pipes 9, remains connected to the vehicle body by tabs 79 engaging threaded pin 7.

What is claimed is:

1. A fastening and protection assembly for protecting and fastening pipes (9) to a supporting structure (5), comprising at least one pipe supporting element (2) defined by a clip (4) and in turn comprising a central portion (10) with a through hole (21; 73) cooperating with a respective fastener (7) for fitment to the supporting structure (5), and at least one seat (8) closed partly by elastic flexible walls (16, 17) enabling a pipe (9) to be inserted inside the seat through a mouth (11) defined by said elastic flexible walls; further comprising a protection element (3), for protecting said pipes (9), in the form of a channel (23) arranged to receive at least a portion of each said clip (4); and snap-on connecting elements (28; 74, 21a) respectively formed on said protection element and said clip for connecting said channel (23) and said clip (4) together in snap fitting relationships;

wherein said channel (23) comprises a protective wall (24) and two longitudinal lateral walls (25,26) joined to and perpendicular to said protective wall (24); said snap-on connecting elements (28) comprising a first pair of retaining teeth (33) carried by said lateral walls (25, 26), and a corresponding mating pair of stop teeth (30) carried by said clip, (4) which retaining and stop teeth cooperate mutually to retain said channel (23) to said clip (4).

2. A fastening and protection assembly as claimed in claim 1, wherein said clip (4) comprises a pair of flexible arms (32) projecting laterally from said clip (4) at ends of a flat supporting base (15) therefore, said base being positioned, in use, facing said supporting structure (5); each flexible arm (32) carrying one of said teeth (30).

3. A fastening and protection assembly as claimed in claim 2, wherein said flexible arms (32) extend outside the clip (4) and substantially parallel to said elastic flexible walls (16) to define open cavities (35); said stop teeth (30) projecting from said flexible arms (32) into said cavities (35).

4. A fastening and protection assembly as claimed in claim 3, wherein said channel (23) is fitted to said clip (4) with said protective wall (24) facing said mouths (11); said lateral walls (25, 26) penetrating said cavities (35) so that said retaining teeth (33) engage said stop teeth (30).

5. A fastening and protection assembly as claimed in claim 1, wherein said at least one seat (8) is defined by a semicylindrical surface (14) opposite said mouth (11).

6. A fastening and protection assembly as claimed in claim 1, wherein said central portion (10) extends axially on a side of said clip opposite to a flat supporting base (15) adapted to support the clip (4) when the base is positioned, in use, facing said supporting structure, said central portion having a collar (22) projecting axially with respect to said mouth (11); said collar (22) defining a locating element for locating a respective slotted hole (27) on said protection element (3) with respect to said clip (4).

7. A fastening and protection assembly as claimed in claim 6, wherein said clip (4) comprises, inside said through hole (21), gripping elements (21a) for gripping said fastener (7) on the supporting structure (5); said gripping elements (21a) providing for an axial snap-on interference connection of said through hole (21, 73) to a respective threaded pin (7) defining said fastener, which connection is only releasable by unscrewing said clip (4) from said pin.

8. A fastening and protection assembly as claimed in claim 1, wherein said two lateral walls (58, 59) of said clip (4) project laterally from the mouth (11) to define two flat lateral supports (60); said clip (4) having a pair of arms (63, 64), which are connected to said flat lateral supports (60), are bent outside said lateral walls away from said mouth (11), and are substantially perpendicular to said lateral walls (58, 59).

9. A fastening and protection assembly as claimed in claim 8, wherein said clip (4) is fitted to said supporting structure (5) with said mouths (11) facing the supporting structure (5).

10. A fastening and protection assembly as claimed in claim 1, wherein said protection element (3) is made of a polypropylene resin, said clip (4) includes a polyamide or acetal resin.

11. A fastening and protection assembly as claimed in claim 1, wherein said channel (23) has a semicircular rib or projection (45) formed on the outside of opposite longitudinal lateral walls (25, 26) of the channel (23).

12. A fastening and protection assembly for protecting and fastening pipes (9) to a supporting structure (5), comprising at least one pipe supporting element (2) defined by a clip (4) and in turn comprising a central portion (10) with a through hole (21; 73) cooperating with a respective fastener (7) for fitment to the supporting structure (5), and at least one seat (8) closed partly by elastic flexible walls (16, 17) enabling a pipe (9) to be inserted inside the seat through a mouth (11) defined by said elastic flexible walls; further comprising a protection element (3), for protecting said pipes (9), in the form of a channel (23) arranged to receive at least a portion of each said clip (4); and snap-on connecting elements (28; 74, 21a) respectively formed on said protection element and said clip for connecting said channel (23) and said clip (4) together in snap fitting relationships;

further comprising a sleeve (74) connectable to said fastener (7); said sleeve (74) being provided internally with gripping elements (21a) for gripping said fastener (7) on the supporting structure (5); said gripping elements (21a) providing for an axial snap-on interference connection of said sleeve (74) to a respective threaded pin (7) defining said fastener, said connection being releasable only by unscrewing said sleeve (74) from said pin; said sleeve (74) being fitted through said through hole (73) in said central portion (10) of the clip (4) and through a corresponding slotted hole (27) in the channel (23) so that a head (75) of the sleeve, having a slot (76) for a screwdriver, rests against said channel and said clip (4).

13. A fastening and protection assembly as claimed in claim 12, wherein said central portion (10) of the clip projects axially, with respect to the mouth (11), with a collar (77) terminating with a flat circular supporting region (78) positioned, in use, facing said supporting structure (5); the collar (77) being provided internally with a number of radial elastic tabs (79) projecting and sloping inwards of said through hole (73) and symmetrically with respect to the axis of the through hole; the through hole (73) being of such a diameter as to house said pin (7) with radial clearance, while at the same time permitting engagement of the pin (7) by said tabs (79) to permit smooth fitment of the clip (70) to the respective threaded pin (7), while at the same time preventing the clip from being withdrawn from the pin by temporarily retaining the clip (70) to the threaded pin (7).

14. A fastening and protection assembly for protecting and fastening pipes (9) to a supporting structure (5), comprising at least one pipe supporting element (2) defined by a clip (4) and in turn comprising a central portion (10) with a through hole (21; 73) cooperating with a respective fastener (7) for fitment to the supporting structure (5), and at least one seat (8) closed partly by elastic flexible walls (16, 17) enabling a pipe (9) to be inserted inside the seat through a mouth (11) defined by said elastic flexible walls; further comprising a protection element (3), for protecting said pipes (9), in the form of a channel (23) arranged to receive at least a portion of each said clip (4); and snap-on connecting elements (28;74, 21a) respectively formed on said protection element and said clip for connecting said channel (23) and said clip (4) together in snap fitting relationships;

wherein said channel (23) has a semicircular rib or projection (45) formed on the outside of opposite longitudinal lateral walls (25, 26) of the channel (23);

further comprising a fixture or pallet (40) in turn comprising a base body (41) having two spaced facing L-shaped jaws (42) hinged laterally to the base body (41) and for elastically gripping the sides of the channel (23) by virtue of springs (43); said jaws (42) having respective grooves (44), each for engaging a respective said rib or projection (45) on the channel (23).

\* \* \* \* \*